UNITED STATES PATENT OFFICE.

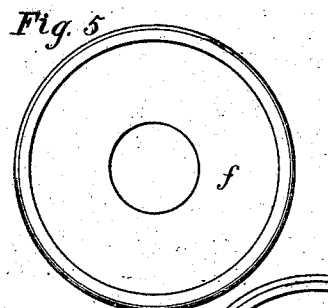
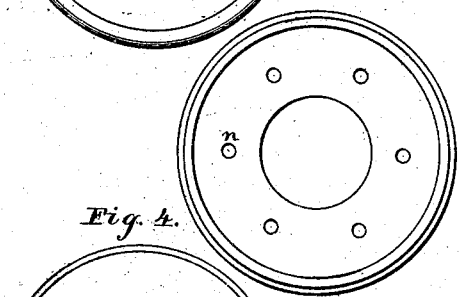
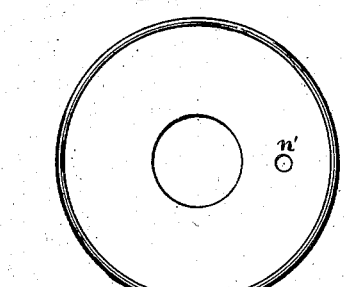
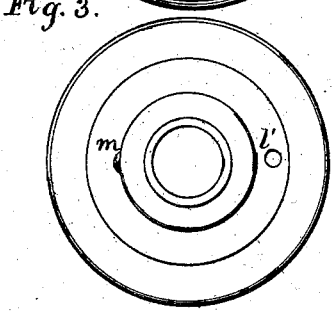
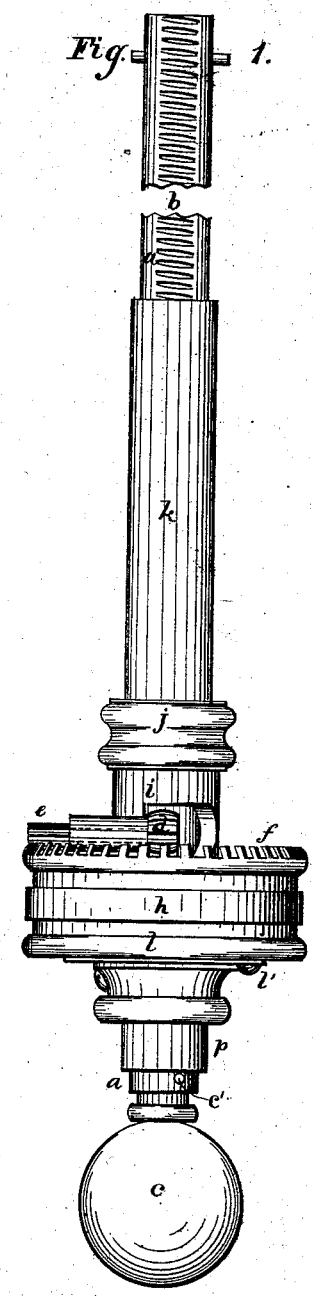

CHARLES Y. TAYLOR AND JOHN T. BRUEN, OF BROOKLYN, NEW YORK.

IMPROVEMENT IN SLIDES FOR CHANDELIERS.

Specification forming part of Letters Patent No. 192,030, dated June 12, 1877; application filed December 20, 1876.

*To all whom it may concern:*

Be it known that we, CHARLES Y. TAYLOR and JOHN T. BRUEN, both of the city of Brooklyn, county of Kings, and State of New York, have invented certain new and useful Improvements in Slides for Chandeliers; and we do hereby declare that the following is a full, clear, and exact description of the same, reference being had to the accompanying drawing, which forms a part of this specification.

The invention consists in a novel and positive combination of gearing, by means of which the adjustable power of a coil-spring is perfectly controlled, for the purpose of holding the drop-light in whatever position it may be desired.

It also consists in a swivel ball-plug, used as a handle, and which readily yields to the natural bend of the wrist when the drop-light is pulled down or pushed up.

Figure 1, in the annexed drawing, represents a side view of the slide. Fig. 2 is a vertical section through the center. Fig. 3 is a lower and upper view of its adjusting-collar. Fig. 4 is a lower and upper view of a spring-box. Fig. 5 is the upper view of a disk-wheel with tangential cogs.

In Figs. 1 and 2, *a* represents a pipe with a toothed rack, *b*, cut in its periphery. This pipe passes through the slide and receives a ball-plug, *c*, at its lower end, held in its place by a transverse pin, *c'*. This plug has a groove around its neck, which permits it to turn freely in the hand when the pipe is pulled down or pushed up. This ball-plug serves as a handle beneath the drop-light basket in chandeliers.

The rack *b*, Fig. 1, is geared with a cog-wheel, *d*, which carries on the outer end of its shaft a small pinion, *e*, which meshes into the disk-wheel with tangential cogs *f*, Fig. 1. To the hub of this wheel is screwed the inner end of a coil-spring, *g*, the outer end of which is likewise screwed to the spring-box *h*, as shown in Fig. 2.

Pipe-boot *i*, Figs. 1 and 2, through which the pipe *a* passes, is held in place by a collar, *j*, by means of the outer or stiffening pipe *k*, which holds the disk-wheel with tangential cogs *f* under its shoulders *i'*. The hub of this wheel, passing through the spring-box, rests below upon the top of the adjusting-collar *l*, Fig. 2, which is screwed to the pipe-boot *i*, and held in place by means of a set-screw, *m*, introduced on its neck and counter-bored in the pipe-boot, as shown in Fig. 2.

The bottom of spring-box, Fig. 4, has six, more or less, screw-holes, *n*, and the adjusting-collar *l* has one hole, *n'*, at a corresponding radial distance with those in the spring-box, and when the coil-spring is adjusted to the desired tension, the screw *l'*, Figs. 1 and 2, is entered into one of the holes in the bottom of the spring-box and screwed up; and *p*, Figs. 1 and 2, is a reducer.

In pulling the pipe *a* downward, its rack *b* communicates motion to cog-wheel *d*, and through its shaft to the small pinion *e*, which turns the disk-wheel with tangential cogs *f* from left to right, and closes the coil-spring *g*, Fig. 2, screwed to its hub, said coil-spring having its resisting-point on its outer end against the spring-box *h*, which is screwed down on the adjusting-collar *l*, which, in its turn, is held in place by set-screw *m*, counter-bored into the pipe-boot *i*.

Thus it will be seen that a perfectly-adjustable tension can be given to the coil-spring at pleasure, and thus adjusted will remain in the desired position because of its rigid connection, only so much of its action as is absorbed by the extent of the ascent or descent of the slide being called into requisition; hence the objectionable feature of all drop-light slides is avoided, and a uniform tension and perfectly-reliable apparatus for lowering and hoisting obtained.

We wish it distinctly understood that we do not confine ourselves to the use of round pipes or tubing, but intend to use any kind or shape.

What we claim as new and useful, and desire to secure by Letters Patent, is—

1. The combination of pipe-boot *i* with its attachments of adjusting-collar *l*, spring-box *h*, and spring *g*, the spring-power resting upon said pipe-boot, and from thence acting upon the gearway of the movable pipe *a* by means of the disk-wheel *f*, pinion *e*, cog-wheel *d*, and gearway *b* in the movable pipe *a*, substantially as described, and for the purpose herein set forth.

2. The combination of gearway $b$, cog-wheel $d$, pinion $e$, and disk-wheel with tangential cogs $f$, by means of which the power of spring $g$ is controlled and acts in a rigid manner upon the movable tube $a$, substantially as described, and for the purpose herein set forth.

3. The ball-plug or swivel handle to drop-light basket.

4. The combination of the racked pipe, the disk-wheel with tangential cogs, the pipe-boot, the spring and spring-box, with adjusting-collar and the ball-plug, or their equivalent, for the purpose set forth.

Dated New York, December 18, 1876.

CHARLES Y. TAYLOR.
JNO. T. BRUEN.

Witnesses:
C. T. BRUEN,
JOHN M. HARRINGTON.